ates Patent [19] [11] 4,030,581

Giometti [45] June 21, 1977

[54] ELECTROMAGNETIC ROLLER CLUTCH

[75] Inventor: Paul F. Giometti, Horseheads, N.Y.

[73] Assignee: Facet Enterprises, Inc., Tulsa, Okla.

[22] Filed: Aug. 25, 1975

[21] Appl. No.: 607,165

[52] U.S. Cl. .................................. 192/16; 192/35; 192/38; 192/44; 192/84 T
[51] Int. Cl.² ................. F16D 67/06; F16D 15/00; F16D 27/10
[58] Field of Search .................. 192/14, 16, 35, 36, 192/38, 44, 84 T

[56] References Cited
UNITED STATES PATENTS

| 3,123,169 | 3/1964 | Young et al. | 192/36 X |
| 3,179,218 | 4/1965 | Burns | 192/84 T X |
| 3,300,002 | 1/1967 | Roper | 192/38 X |
| 3,491,864 | 1/1970 | Niu | 192/35 X |
| 3,905,458 | 9/1975 | Mehrbrodt | 192/35 X |

Primary Examiner—Allan D. Herrmann
Attorney, Agent, or Firm—Remy J. VanOphem

[57] ABSTRACT

An electromagnetic clutch has a driving member and a driven member with rollers positioned between opposing non-parallel surfaces on the members. An armature operated by an electromagnet has fingers for moving the rollers into frictional engagement with the surfaces when the electromagnet is energized to engage the clutch and for moving the rollers out of engagement with at least one opposing surface when the electromagnet is deenergized to disengage the clutch.

11 Claims, 2 Drawing Figures

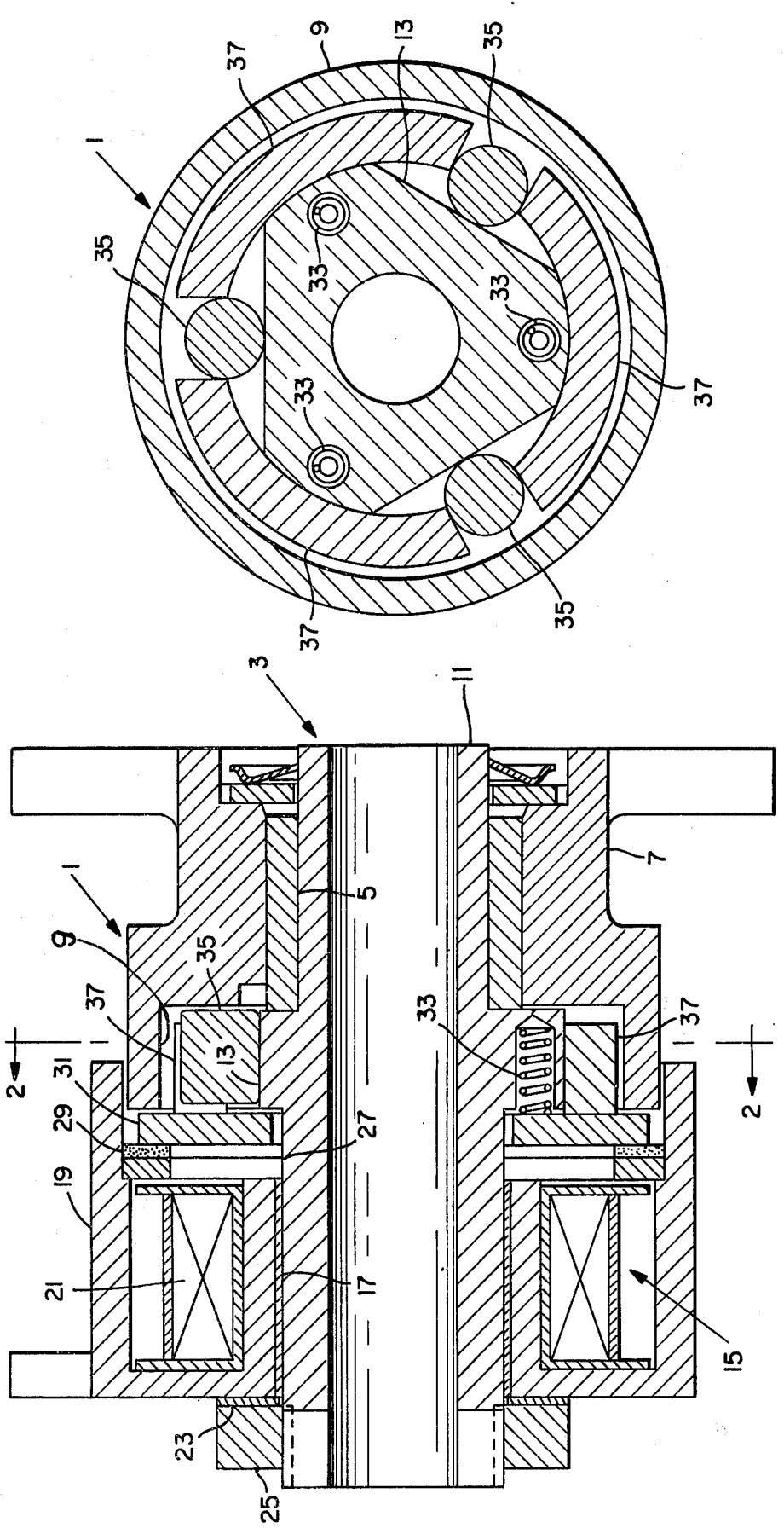

ELECTROMAGNETIC ROLLER CLUTCH

The invention relates to electrically operated friction devices and more particularly to electromagnetic clutches.

BACKGROUND OF THE INVENTION

Friction clutches as used heretofore, usually have opposing surfaces on the driving and driven members which are moved into engagement with one another to provide a friction drive for connecting the members. While clutches of this kind have good control features they require a substantial force to prevent the friction members from slipping relative to one another when delivering relatively high torques. When an electromagnet is used for moving the members into engagement with one another a relatively high current is required.

To avoid this problem, overrunning clutches were used for delivering high torques and usually included rollers or balls between the driving and driven members. One of the members had cam surfaces for engaging the rollers or balls to provide a driving connection between the members. As the rollers or balls rolled onto the cam surface they wedged between the members and attempted to ride higher on the cam surfaces thereby locking the members together. In some instances, especially after the surfaces became worn, it was difficult to disengage the clutch.

SUMMARY OF THE INVENTION

The present invention relates to friction clutches and avoids the difficulties inherent in such clutches by using rollers or balls between the driving and driven members similarly to overrunning clutches as described above except that the opposing surfaces on the driving and driven members are designed so that the rollers or balls do not wedge tightly between the driving and driven members when engaging the opposing surfaces. Instead, the rollers or balls are moved into frictional engagement with the opposing surfaces and are held there by fingers which are controlled by an electromagnet. To insure positive release of the clutch the fingers also move the rollers or balls out of engagement with at least one opposing surface.

A clutch constructed according to the present invention has the positive control of friction clutches without requiring high current and avoids the disadvantages of overrunning clutches.

The clutch also provides a driving connection between the driving and driven members irrespective of the direction of rotation of the driving member.

The invention comtemplates an electromagnetic clutch comprising a driving member and a driven member having opposing non-parallel surfaces, rollers positioned between the opposing surfaces, means for providing relative rotation between the members when the clutch is disengaged, and an electromagnet for engaging the clutch including an armature having a plurality of fingers for moving the rollers into engagement with theopposing surfaces to provide a friction drive between the driving and driven members when the electromagnet is energized.

DRAWING

FIG. 1 is an axial section of an electromagnetic clutch constructed according to the invention, and FIG. 2 is a transverse vertical section taken approximately on the line 2—2 of FIG. 1.

DETAILED DESCRIPTION OF THE INVENTION

Referring to the drawing, the novel electromagnetic clutch constructed according to the invention and shown therein comprises a driving member 1 rotatable on a driven member 3 by a bearing 5 therebetween when the clutch is disengaged. Driving member 1 has a pulley 7 for drivably connecting the driving member to a motor or the like. The driving member 1 also includes a ring shaped outer magnetic pole 9.

Driven member 3 comprises a sleeve 11 secured to a driven shaft (not shown) by a key or other suitable means. Inner magnetic pole 13 is formed integral with sleeve 11 radially inwardly of outer pole 9 and is substantially triangular in shape. An electromagnet 15 is rotatably supported on sleeve 11 by a bearing 17 and includes a circular cord 19 of magnetic material having a substantially U-shaped cross-section with a coil 21 between the legs of the U. The coil 21 is energized by an electrical source (not shown) to engage the clutch. A thrust washer 23 at one end of the electromagnet bears against a ring 25 secured to sleeve 11. Sleeve 11 rotates relative to electromagnet 15 when the clutch is engaged to avoid the use of slip rings for providing power to the electromagnetic.

A brake 27 is secured to core 19 of the electromagnet on the legs of the U. The brake has a layer of non-magnetic friction material 29 on one surface adjacent outer pole 9 and inner pole 13.

A ring-shaped armature 31 of magnetic material surrounds sleeve 11 and is positioned between brake 27 and outer pole 9 and inner pole 13. Springs 33 recessed in inner pole 13 and extending axially of sleeve 11 urge armature 31 into engagement with brake 27 when the electromagnet is deenergized. A plurality of rollers 35 are positioned between inner pole 13 and outer pole 9 and their positions between the opposing non-parallel surfaces on the poles are controlled by arcuate fingers 37 of non-magnetic material attached to armature 31.

OPERATION

When the electromagnet is deenegized the clutch is disengaged and armature 31 is urged by springs 33 into engagement with brake 27 and rollers 35 are disengaged from at least one of the opposing surfaces on outer pole 9 and inner pole 13 to enable driving member 1 to rotate relative to driven member 3. The clutch is engaged by energizing electromagnet 15 whereupon armature 31 is magnetically attracted to inner pole 13 and outer pole 9 and starts to rotate with outer pole 9. Fingers 37 on armature 31 move rollers 35 between the opposing surfaces until the rollers 35 engage the sides of the triangular surface of inner pole 13 and the inner circular surface of outer pole 9 and provide a driving connection between driving member 1 and driven member 3. The torque transmitted by the driving member to the driven member is determined by the frictional engagement of rollers 35 with the opposing surfaces on the poles and the magnetic engagement of armature 31 with the poles. Should slippage between the driving and driven members occur because of an increased load, fingers 37 on armature 31 move rollers 35 into tighter engagement with the sides of the triangular surface of inner pole 13 and the inner circular surface of pole 9. The triangular surface of inner pole 13 and the circular surface on pole 9 are shaped and arranged so that rollers 35 must be held in frictional engagement with both opposing surfaces by fingers 37 on armature 31 thus preventing the rollers from wedging between the opposing surfaces as would be the case in an overrunning clutch which uses cam surfaces. The opposing surfaces on poles 9 and 13 are formed and arranged so that the clutch drivably connects the driving member 1 to the driven member 3 irrespective of the direction of rotation of the driven member 3.

The clutch is disengaged by deenergizing the electromagnet whereupon armature 31 is moved by springs 33 into engagement with stationary brake 27. Armature 31 starts to discontinue rotating and fingers 37 disengage rollers 35 from the inner surface of outer pole 9 so there is no longer a driving connection between the driving and driven members and the driven member also stops rotating. While the clutch has been described as using rollers it should be understood that balls or other suitable means may be used instead and the word "rollers" as used in the specification and claims is intended to include this structure. Also, the clutch may disengage when the electromagnet is energized and engage when the electromagnet is deenergized by reversing the directions of force exerted on the armature by the electromagnet and spring.

A clutch constructed according to the invention has the control features of a friction clutch and the driving engagement of an overrunning clutch. The clutch uses less power and delivers more torque than a friction clutch. Engagement and disengagement of the clutch is positive because the fingers positively position the rollers between the opposing surfaces thus avoiding the use of springs for this purpose. Also, the clutch drivably connects the driven member to the driving member when the driving member's direction of rotation is reversed.

What is claimed is:
1. An electromagnetic clutch comprising:
   a driving member and a driven member having opposing non-parallel surfaces;
   roller members positioned between said opposing non-parallel surfaces;
   means for providing relative rotation between said members when the clutch is disengaged;
   electromagnetic actuating means mounted adjacent said driven and driving members, said electromagnetic actuating means comprising:
   a housing core rotatably mounted to said driven member;
   a coil fixedly mounted within said housing core, said driven member being rotatable relative to said housing core and coil when said clutch is engaged; and
   an armature member mounted to said driven member, said armature member further comprising a plurality of fingers formed and arranged to move said roller members into engagement with said opposing surfaces to provide a friction drive between said driving and driven members.

2. An electromagnetic clutch as described in claim 1 in which the finger are formed and arranged to move the rollers out of engagement with at least one opposing surface to disengage the clutch.

3. An electromagnetic clutch as described in claim 2 in which the opposing non-parallel surfaces are formed and arranged to provide a friction drive in both directions between the driving and driven members when the clutch is engaged.

4. An electromagnetic clutch as described in claim 1 in which the electromagnet includes a pole on the driving member and a pole on the driven member and the armature is magnetically attracted to the poles when the electromagnet is energized and relative movement between the poles accuates the fingers on the armature for moving the rollers.

5. An electromagnet clutch as described in claim 4 in which the opposing non-parallel surfaces are formed on the poles.

6. An electromagnetic clutch as described in claim 5 in which the opposing surface on one pole is substantially circular in shape and the opposing surface on the other pole is substantially triangular in shape.

7. An electromagnetic clutch as described in claim 5 in which the magnetic attraction of the armature to the poles also provides a friction drive between the driving and driven members.

8. An electromagnetic clutch as described in claim 1 in which the opposing non-parallel surfaces are shaped and arranged to avoid the rollers wedging between the surfaces when the clutch is engaged.

9. An electromagnetic clutch as described in claim 8 in which one opposing non-parallel surface is substantially circular in shape and the other opposing non-parallel surface is substantially triangular in shape.

10. An electromagnetic clutch as described in claim in which a brake is secured to the housing core of the electromagnet for engaging the armature to move the rollers out of engagement with at least one opposing surface to disengage the clutch.

11. An electromagnetic clutch as described in claim 10 which includes spring means for moving the armature into engagement with the brake when the electromagnet is deenergized.

* * * * *

UNITED STATES PATENT OFFICE
CERTIFICATE OF CORRECTION

Patent No. 4,030,581   Dated June 21, 1977

Inventor(s)   Paul F. Giometti

It is certified that error appears in the above-identified patent and that said Letters Patent are hereby corrected as shown below:

Column 1, line 62, preceding "surfaces" delete "theopposing" and insert -- the opposing--;

Column 4, line 10, following "the" delete "finger" and insert -- fingers--;

Column 4, line 44, following "claim" insert -- 1--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*